Figure 4:
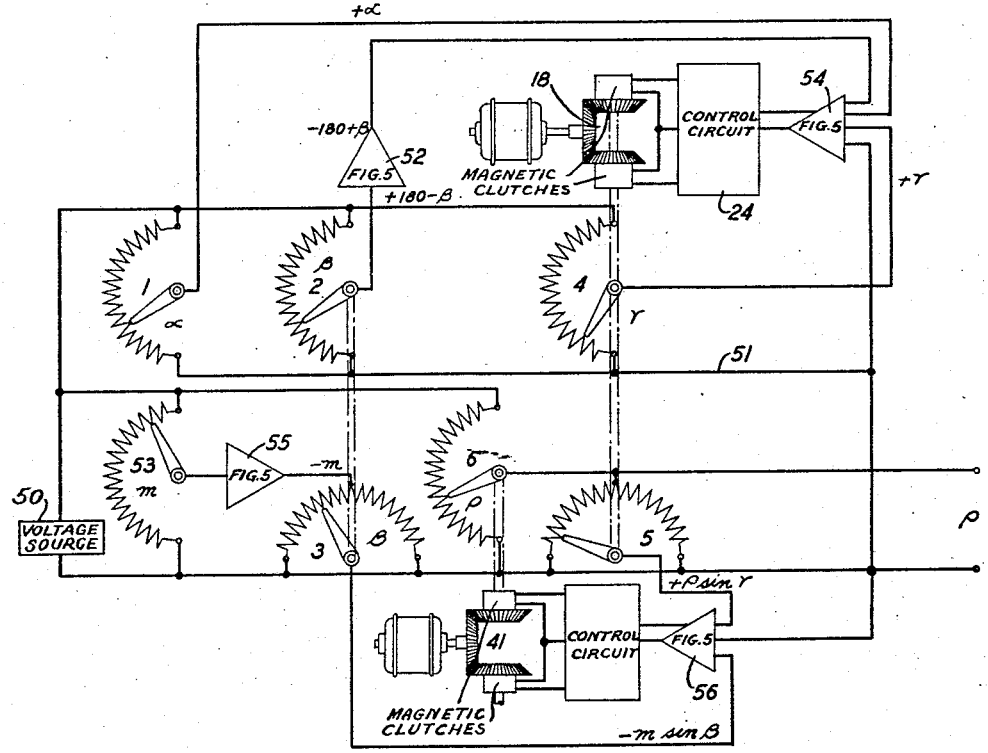

June 22, 1948.  C. A. LOVELL ET AL  2,443,624
RANGE COMPUTER
Filed April 23, 1942  2 Sheets-Sheet 1
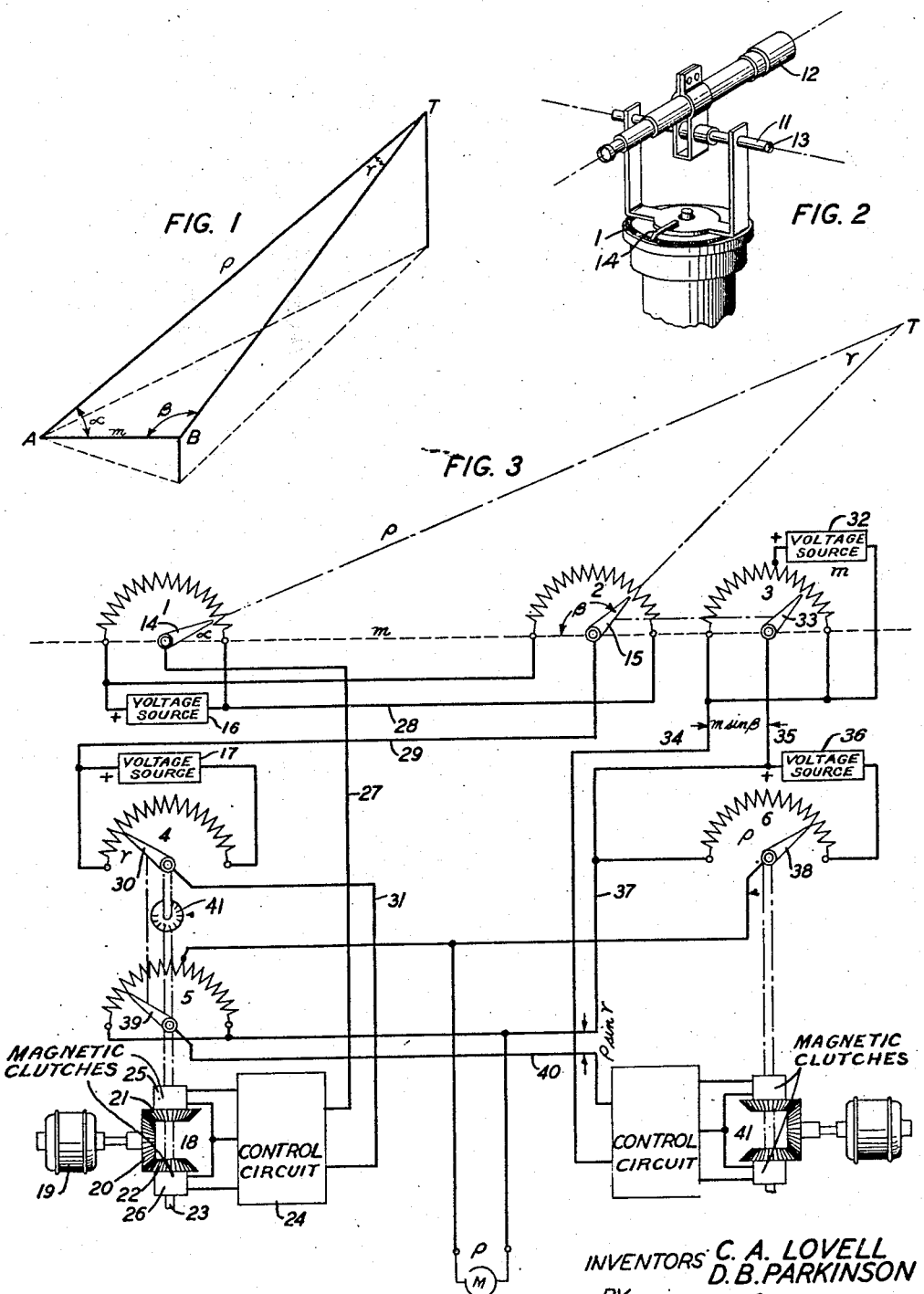
INVENTORS C. A. LOVELL
D. B. PARKINSON
BY
E. V. Griggs
ATTORNEY Patented June 22, 1948

2,443,624

UNITED STATES PATENT OFFICE 2,443,624

RANGE COMPUTER

Clarence A. Lovell and David B. Parkinson, Maplewood, N. J., assignors to Bell Telephone Laboratories, Incorporated, New York, N. Y., a corporation of New York Application April 23, 1942, Serial No. 440,167

2 Claims. (Cl. 235—61.5)

This invention relates to systems for the control of artillery fire, and particularly to systems for determining the distance from an observation point to a target.

The object of the invention is the determination of the distance from an observation point to a target, and the representation of this distance in the form of an electrical difference of potential.

A feature of the invention is a method of determining the desired distance by electromechanical means which attain a null balance.

Another feature of the invention is a method of representing the desired distance in the form of an electrical difference of potential obtained by measurements taken from two spaced points of observation and involving only the sine or cosine functions of the angles involved.

In one known system of this type, the distance is determined by a method involving the difference of two tangent functions, and is represented by a voltage which is the direct algebraic sum of two voltages. As the tangent functions vary from zero to infinity, it is not physically possible to produce a representation of these functions for all angles. In the present invention, using only sine or cosine functions which vary from zero to unity, all values of these functions may be represented by practical values of physical quantities. And, in the known system, the desired quantity is represented by the algebraic sum of two voltages which are directly dependent upon the value of the voltage of the source, thus any variation in the value of the voltage from the source will directly affect the accuracy. In the present invention, a null method is used to determine the desired voltage and this voltage is thus not directly affected by changes in the voltage from the source.

In another known system, the desired distance is determined by a method involving the cosecant function of an angle, and by the direct addition of voltages representing the logarithmic values of certain quantities. In this known system, also, the cosecant function cannot be represented for all angles by any physical means, and the accuracy of the determination depends upon the constancy of the source of voltage.

Figure 5:
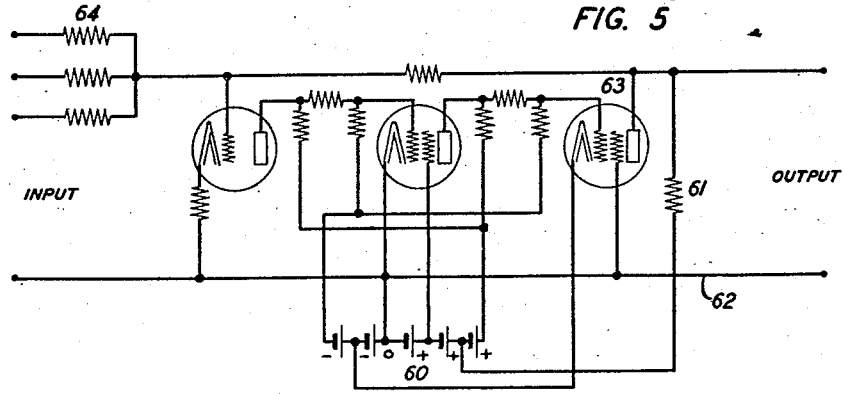

In the drawings,

Fig. 1 diagrammatically shows the observation points and the target;

Fig. 2 shows a simple form of tracking telescope;

Fig. 3 schematically shows a computing unit embodying the invention;

Fig. 4 schematically shows a system embodying the invention which is controlled by a single source of voltage; and Fig. 5 schematically shows a repeater used in the system of Fig. 4.

Tracking telescopes, or other suitable sighting devices, are located at the observation points A, B, Fig. 1, located at the extremities of a line AB having a known length $m$ units. The tracking telescopes measure the angles $\alpha$ and $\beta$, from the base line to the target, in the plane ABT. The tracking telescopes are mounted in some simple form of equatorial mounting with one axis of rotation in the line AB. As shown in Fig. 2, the axis of rotation 11 of the tracking telescope 12 may be pierced by a hole 13, which may house suitable lenses, or, if preferred, a separate telescope, or sighting points, may be arranged parallel to the axis of rotation 11. By sighting along the axis of rotation of one tracking telescope to the axis of the other telescope, the axis of the first telescope may be moved into coincidence with the line AB and the telescope is aligned to rotate in azimuth in a plane containing the line AB.

The windings of the potentiometers 1, 2, 4, Fig. 3, have a uniform resistance per unit length and extend over an effective arc of 180 degrees. The wipers 14, 15 of the potentiometers 1, 2 are respectively moved proportionally to the angles $\alpha$ and $\beta$ described by the movements of the tracking telescopes at points A and B. The potentiometers 1, 2 may, if desired, be mounted in the pedestals supporting the telescopes as shown in Fig. 2 and the wipers 14, 15 may be moved directly, or through suitable gearing, by the telescopes.

A source of voltage 16, such as a battery, is connected to the windings of the potentiometers 1, 2. If the stations A, B are some distance apart, separate sources may be used. A source of voltage 17 is connected to the winding of the potentiometer 4. Preferably, the sources 16 and 17 are so connected that any changes in voltage occur simultaneously and to the same degree in both sources.

The device 18 is any type of reversible power system which may be controlled in position and movement by the variations in amplitude of an electric current. For convenience of description, but not as any limitation on the scope of the present invention, a device of the type shown in United States Patent 2,003,913, June 4, 1935, E. C. Wente, may be used. In this device the motor 19 drives the gear 20, meshing with the gears 21, 22 loosely mounted on the shaft 23. When a voltage is applied to the control circuit 24, one or the other of the magnetic clutches 25, 26, affixed to the shaft 23, is energized to cause the corresponding gear to turn the shaft 23. If the sources 16, 17 supply alternating voltages, the wires 27, 31 are connected to terminals 30, 31 of the control circuit shown in the patent. If the sources 16, 17 supply direct voltages, the transformer 36 shown in Fig. 4 of the patent is removed, the grids of the vacuum tubes 37, 38 are connected to one of the wires 27, 31, the source 39 is connected to the other wire, the biasing voltage of the source 39 is reduced from the cut-off value to a normal value, and the resistance 34 is adjusted for the change in impedance of the vacuum tubes 37, 38. Any other suitable type of servo-motor may be used.

The clutches 25, 26 are controlled by the difference of potential supplied by the wires 27, 31 to the control circuit 24. The source 16 is connected across the winding of potentiometer 1, the positive pole being connected to the left end of the winding. The wiper 14 will thus have a positive potential with respect to wire 28 proportional to $+\alpha$, and this potential is supplied by the wire 27 to the control circuit. The source 16 is also connected across the winding of potentiometer 2, the positive pole being connected to the left end of the winding. The wiper 15 will thus have a positive potential with respect to the wire 28. The potential drop across the whole winding of potentiometer 2 is made proportional to 180 degrees, thus the voltage with respect to wire 28 selected by the wiper 15 is proportional to $+(180-\beta)$. This voltage is supplied by wire 29 to the left end of the winding of potentiometer 4. The source 17 is connected across the winding of potentiometer 4, the positive pole being connected to the left end of the winding. The voltage selected by the wiper 30 is thus negative with respect to wire 29 and is approximately proportional to $-\gamma$. The potential of the wire 31 with respect to the wire 28 will thus be proportional to $+(180-\beta)-\gamma$, but this potential on the wire 31 opposes, in the control circuit 24, the potential of the wire 27 and is thus effectively reversed in polarity to $-(180-\beta)+\gamma$. The sum of the voltages supplied to the control circuit 24 will thus be $$+\alpha-(180-\beta)+\gamma, \text{ or } \delta e=\alpha+\beta+\gamma-180$$

The control circuit 24 energizes the appropriate clutch 25 or 26 to cause the shaft 23 to rotate, moving the wiper 30 and changing the voltage representing the angle $\gamma$ until the difference voltage $\delta e=0$, when the angular position of the wiper 30 and dial 41, will represent the angle $\gamma$, that is, the angle ATB, Fig. 1.

The potentiometer 3 has a winding varying in resistance per unit length as a sinusoidal function from 0 to 180 degrees. The positive pole of a source of voltage 32 is connected to the midpoint of the winding of the potentiometer 3 and the negative pole is connected to both ends of the winding. The voltage of the source 32 represents, to a scale of volts per unit length, the distance $m$ between the observation points A and B. The wiper 33 is moved with the wiper 15 by suitable linkage or gearing. The potential difference between the wires 34, 35 will thus be proportional to $+m \sin \beta$.

The winding of the potentiometer 6 has a constant resistance per unit length. The positive pole of a source of voltage 36 is connected to one end of the winding of potentiometer 6 and to wire 37 which is connected to both ends of the winding of potentiometer 5, and to an output terminal, and the negative pole of the source 36 is connected to the other end of the winding of potentiometer 6. The potentiometer 5 has a winding varying in resistance per unit length with a sinusoidal function. The negative voltage with respect to wire 37 on wiper 38 is connected to an intermediate point of the winding of potentiometer 5 and the positive pole of the source 36 is connected by wire 37 to both the ends of the winding.

The voltage selected by the wiper 38 may be designated $-\rho$. The wiper 39 of the potentiometer 5 is driven by the shaft 23, either directly or through suitable gearing, through the angle $\gamma$. Then the voltage selected by the wiper 39 will be proportional to $-\rho \sin \gamma$.

A circuit may be traced from wire 34 through winding of potentiometer 3 to wiper 33, wires 35, 37, winding of potentiometer 5, wiper 39, wire 40 to the control circuit of a second servo-motor 41, which is similar to the servo-motor 18 and drives the wiper 38. The voltage selected by the wiper 33 is proportional to $+m \sin \beta$, and the voltage selected by the wiper 39 is proportional to $-\rho \sin \gamma$. The voltage applied to the control circuit of the servo-motor 41 is $\delta e_2 = m \sin \beta - \rho \sin \gamma$.

In Fig. 1, by the law of sines $$\frac{m}{\sin \gamma} = \frac{\rho}{\sin \beta}$$

thus $m \sin \beta = \rho \sin \gamma$ and $m \sin \beta - \rho \sin \gamma = 0$. The servo-motor 41 is actuated by the difference voltage $\delta e_2$ to move the wiper 38 until the difference voltage is reduced to zero, thus making the potential difference between the wire 37 and wiper 38 proportional to $\rho$, in the same scale of volts per unit length as used for the base line $m$, which may be indicated on a meter M.

The system shown in Fig. 4 is essentially the same as the system shown in Fig. 3 except that only one source of voltage 50 is required for the computations. The corresponding potentiometers and servo-motors in Figs. 3 and 4 have similar reference characters.

The voltages selected by the wipers of the potentiometers 1, 2 and 4 are, in this case, all in parallel and of the same polarity with respect to the common return 51, which may conveniently be grounded. The angles $\alpha$ and $\gamma$ are measured clockwise from the lower terminals of the potentiometers 1 and 4. The angle $180-\beta$ is also measured clockwise from the lower terminal of the potentiometer 2, thus the angle $\beta$ is measured counter-clockwise from the upper terminal of the potentiometer 2. It is thus necessary to reverse the polarity of the voltage from the potentiometer 2 from a voltage representing $+180-\beta$ to a voltage representing $-180+\beta$. The polarity may be reversed by any suitable means, such as a thermionic repeater having an odd number of stages. A suitable repeater for this purpose is disclosed in United States Patent 2,401,779, patented June 11, 1946 by K. D. Swartzel, Jr., assigned to the assignee of the present application and shown in Fig. 5.

The repeater shown in Fig. 5, from one point of view, may be considered as a low frequency amplifier having an odd number of stages, and using sufficient reverse feedback to make the over-all voltage gain equal to unity. The amplifier then becomes a repeater which reverses the polarity of the applied voltage, without changing the magnitude or wave shape.

The repeater shown in Fig. 5 has another valuable property. When a conductive load is connected across the output circuit, current can flow from battery 60, through resistor 61, the connected load and wire 62 back to battery. A second current can also flow from battery through wire 62, the connected load, anode to cathode of vacuum tube 63 to a negative tap on the battery 60. By adjustment of the negative tap, these currents may be made equal and, as these currents flow in opposite directions, no voltage drop will be produced across the load. The application of a voltage through one of the input resistors, such as 64, will produce a voltage on the control electrode of the vacuum tube 63 which will upset this balance and produce a voltage across the load circuit equal to the applied voltage. A number of voltages may be applied in parallel through the input resistors and a voltage will be produced across the load circuit which is the sum of the applied voltages reversed in polarity.

The voltage selected by the wiper of potentiometer 2 is proportional to $+180-\beta$, and this voltage is reversed in polarity by the repeater 52 to be proportional to $-180+\beta$. The voltage selected by the wiper of the potentiometer 1 is proportional to $+\alpha$, and the voltage selected by the wiper of potentiometer 4 represents $+\gamma$. All of these voltages are supplied to the repeater 54 of the type shown in Fig. 5. The output circuit of this repeater will develop a voltage of the form $+180-\alpha-\beta-\gamma$. This voltage is supplied to the control circuit 24 of the servo-motor 18, and actuates the servo-motor to rotate the wiper of potentiometer 4, varying the voltage selected by the wiper of potentiometer 4 to make the applied voltage equal zero, thus moving the wipers of the potentiometers 4 and 5 a distance proportional to $\gamma$.

The added potentiometer 53 selects a voltage proportional to the base line distance $m$ which is reversed in polarity by the repeater 55, and applied to the mid-point of the winding of potentiometer 3. The wiper of potentiometer 3 is moved with the wiper of potentiometer 2 through a distance proportional to the angle $\beta$, thus selecting a voltage proportional to $-m \sin \beta$.

The wiper of the potentiometer 6 selects a voltage representing the slant distance $\rho$ and applies this voltage to the mid-point of the winding of potentiometer 5. The wiper of potentiometer 5 is moved by the servo-motor 18 through a distance proportional to the angle $\gamma$ and selects a voltage representing $+\rho \sin \gamma$. The voltages selected by the wipers of the potentiometers 3 and 5 are added in the repeater 56 to produce a voltage of the form $+m \sin \beta - \rho \sin \gamma$ which is applied to the control circuit of the servo-motor 41. The servo-motor 41 rotates the wiper of potentiometer 6 until this applied voltage is reduced to zero, thus making the voltage, with respect to wire 51, selected by the wiper of potentiometer 6 proportional to $\rho$.

What is claimed is:

1. In a system for producing a voltage proportional to the distance to an object from a first station, said first station and a second station being spaced apart a known distance along a base line, a source of voltage, first means connected to said source and controlled by observations of said object to produce a first voltage of one polarity proportional to the angle at said first station between said base line and the line to said object, second means connected to said source and controlled by observations of said object to produce a second voltage of opposite polarity proportional to the supplement of the angle at said second station between said base line and the line to said object, adjustable means connected to said source to fractionate the voltage from said source, a first mechanism connected to all said means and controlled by the sum of the voltages from said means to adjust said adjustable means to make the sum of said voltages zero, whereby said mechanism is moved proportionally to the angle at said object subtending said base line, third means connected to said source and adjusted to select a voltage proportional to said known distance, fourth means connected to said third means and adjusted proportionally to the angle at said second station to select a voltage of one polarity proportional to the product of said distance multiplied by the sine of the angle at said second station, other adjustable means connected to said source, fifth adjustable means connected to said other adjustable means and moved by said first mechanism to fractionate the voltage from said other adjustable means proportionally to the sine of the angle at said object, a second mechanism connected to said fourth and fifth means and controlled by the sum of the voltages from said means to adjust said other adjustable means to make the sum of said voltages zero, whereby said second mechanism is moved proportionally to the distance from said first station to said object, and the voltage from said other adjustable means is made proportional to said distance.

2. Apparatus for indicating the length of one side of a triangle which comprises, a source of a first voltage of one polarity adjusted to be proportional in amplitude to the measured length of another side of said triangle, an adjustable resistor having a winding varying in resistance with a sinusoidal function connected to said source and adjusted to modify the amplitude of the voltage from said source proportionally to the sine of an angle adjacent to said other side, a source of a second voltage of opposite polarity, motor driven means connected to said source for modifying the amplitude of said second voltage, a second adjustable resistor having a winding varying in resistance with a sinusoidal function connected to said means and adjusted to further modify the amplitude of said second voltage proportionally to the sine of the angle of said triangle subtending said other side, summing means having an input circuit connected to said adjustable resistors and an output circuit connected to said motor driven means to drive said means to vary the amplitude of said second voltage until the sum of said voltages is reduced substantially to zero, and a meter connected to said motor driven means to indicate the modified amplitude of said second voltage, whereby the modified amplitude of said second voltage, and said indication, are made proportional to said one side of said triangle.

CLARENCE A. LOVELL.
DAVID B. PARKINSON.

REFERENCES CITED

The following references are of record in the file of this patent:

UNITED STATES PATENTS

| Number | Name | Date |
| --- | --- | --- |
| 444,217 | Fiske | Jan. 6, 1891 |
| 1,154,252 | Kennedy | Sept. 21, 1915 |
| 1,368,224 | Meitner | Feb. 8, 1921 |
| 2,087,667 | Hedin | July 20, 1937 |
| 2,134,901 | Wey | Nov. 1, 1938 |

FOREIGN PATENTS

| Number | Country | Date |
| --- | --- | --- |
| 218,548 | Great Britain | July 10, 1924 |